(12) United States Patent
Krasovskiy et al.

(10) Patent No.: US 11,242,415 B2
(45) Date of Patent: Feb. 8, 2022

(54) BIS-PHENYL-PHENOXY POLYOLEFIN CATALYSTS HAVING AN ALKOXY- OR AMIDO-LIGAND ON THE METAL FOR IMPROVED SOLUBILITY

(71) Applicant: Dow Global Technologies LLC, Midland, MI (US)

(72) Inventors: Arkady L. Krasovskiy, Lake Jackson, TX (US); David R. Wilson, Midland, MI (US); Tulaza Vaidya, Collegeville, PA (US); Edmund M. Carnahan, Lake Jackson, TX (US); Philip P. Fontaine, Lake Jackson, TX (US); Carl N. Iverson, Los Alamos, NM (US)

(73) Assignee: Dow Global Technologies LLC, Midland, MI (US)

( * ) Notice: Subject to any disclaimer, the term of this patent is extended or adjusted under 35 U.S.C. 154(b) by 29 days.

(21) Appl. No.: 16/646,209

(22) PCT Filed: Sep. 19, 2018

(86) PCT No.: PCT/US2018/051680
§ 371 (c)(1),
(2) Date: Mar. 11, 2020

(87) PCT Pub. No.: WO2019/067280
PCT Pub. Date: Apr. 4, 2019

(65) Prior Publication Data
US 2020/0277412 A1    Sep. 3, 2020

Related U.S. Application Data

(60) Provisional application No. 62/565,780, filed on Sep. 29, 2017.

(51) Int. Cl.
| | | |
|---|---|---|
| *C07F 7/00* | (2006.01) |
| *C08F 4/76* | (2006.01) |
| *C08F 4/64* | (2006.01) |
| *C08F 10/02* | (2006.01) |
| *C08F 210/16* | (2006.01) |

(52) U.S. Cl.
CPC ...... *C08F 4/64058* (2013.01); *C08F 4/64193* (2013.01); *C08F 10/02* (2013.01); *C08F 210/16* (2013.01); *C07F 7/00* (2013.01); *C08F 2500/03* (2013.01)

(58) Field of Classification Search
CPC .............................. C08F 4/64193; C07F 7/00
See application file for complete search history.

(56) References Cited

U.S. PATENT DOCUMENTS

| | | |
|---|---|---|
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | Lapointe |
| 5,350,723 A | 9/1994 | Neithamer et al. |
| 5,425,872 A | 6/1995 | Devore et al. |
| 5,625,087 A | 4/1997 | Neithamer et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 6,103,657 A | 8/2000 | Murray |
| 6,515,155 B1 | 2/2003 | Klosin et al. |
| 6,696,379 B1 | 2/2004 | Carnahan et al. |
| 6,869,904 B2 | 3/2005 | Boussie et al. |
| 7,060,848 B2 | 6/2006 | Boussie et al. |
| 7,163,907 B1 | 1/2007 | Canich et al. |

(Continued)

FOREIGN PATENT DOCUMENTS

| | | |
|---|---|---|
| CN | 102712795 A | 10/2012 |
| GB | 1069848 A | 5/1967 |

(Continued)

OTHER PUBLICATIONS

Zimm, Bruno H., "Apparatus and Methods for Measurement and Interpretation of the Angular Variation of Light Scattering; Preliminary Results on Polystyrene Solutions", Journal of Chemical Physics, vol. 16, 12, 1099-1116 (1948).
G. Soave, "Redlick-Kwong-Soave (RKS) Equation of State," Chemical Engineering Science, 1972, vol. 27, pp. 1197-1203.
Balke et al., "A Strategy for Interpreting Multidetector Size-Exclusion Chromatography Data II", Chromatography of Polymers, Chapter 13, pp. 199-219 (1992).
Mourey and Balke, Chromatography of Polymers, Chapter 12, pp. 180-198, (1992).

(Continued)

*Primary Examiner* — Rip A Lee
(74) *Attorney, Agent, or Firm* — Dinsmore & Shohl LLP

(57) ABSTRACT

Embodiments are directed to a catalyst system comprising metal ligand complexes and processes for polyolefin polymerization using the metal ligand complex having the following structure: where X is selected from the group consisting of $-OR^X$ or $NR^X_2$.

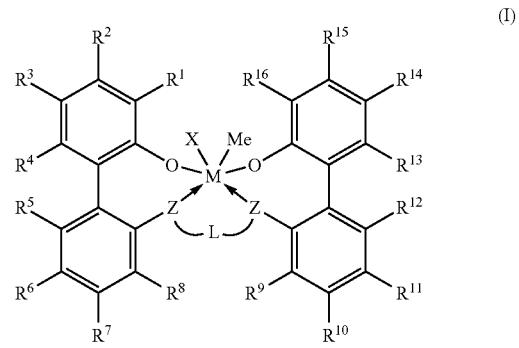

(I)

10 Claims, No Drawings

(56) References Cited

U.S. PATENT DOCUMENTS

| | | | |
|---|---|---|---|
| 7,951,882 B2 | 5/2011 | Arriola et al. | |
| 8,609,794 B2 | 12/2013 | Klosin et al. | |
| 8,729,201 B2 | 5/2014 | Fontaine et al. | |
| 9,029,487 B2 | 5/2015 | Klosin et al. | |
| 9,102,819 B2 | 8/2015 | Kapur et al. | |
| 9,200,185 B2 | 12/2015 | Knutson et al. | |
| 9,511,567 B2 | 12/2016 | Hu et al. | |
| 9,522,855 B2* | 12/2016 | Klosin | C08F 10/00 |
| 9,527,940 B2* | 12/2016 | Demirors | C08F 210/16 |
| 9,527,941 B2 | 12/2016 | Demirors et al. | |
| 9,601,230 B2 | 3/2017 | Nair et al. | |
| 9,601,231 B2 | 3/2017 | Klosin et al. | |
| 9,605,098 B2 | 3/2017 | Klosin et al. | |
| 9,643,900 B2 | 5/2017 | Arriola et al. | |
| 9,975,975 B2* | 5/2018 | Ewart | C08F 4/65904 |
| 2004/0005984 A1 | 1/2004 | Boussie et al. | |
| 2004/0127614 A1 | 7/2004 | Jiang et al. | |
| 2005/0080281 A1 | 4/2005 | Boussie et al. | |
| 2005/0288412 A1 | 12/2005 | Hohner et al. | |
| 2010/0036069 A1 | 2/2010 | Konze et al. | |
| 2011/0039082 A1 | 2/2011 | Fun et al. | |
| 2011/0054122 A1* | 3/2011 | Klosin | C08F 10/00 525/195 |
| 2011/0082249 A1 | 4/2011 | Shan et al. | |
| 2011/0282018 A1 | 11/2011 | Klosin et al. | |
| 2011/0313106 A1 | 12/2011 | Shan et al. | |
| 2012/0116034 A1 | 5/2012 | Oswald et al. | |
| 2013/0030135 A1 | 1/2013 | Hagadorn et al. | |
| 2013/0090430 A1 | 4/2013 | Robert et al. | |
| 2013/0144018 A1 | 6/2013 | Klosin et al. | |
| 2014/0330056 A1 | 11/2014 | Klosin et al. | |
| 2014/0357918 A1 | 11/2014 | Klosin et al. | |
| 2015/0337062 A1 | 11/2015 | Demirors et al. | |
| 2015/0337063 A1 | 11/2015 | Demirors et al. | |
| 2015/0344601 A1 | 12/2015 | Demirors et al. | |
| 2015/0344602 A1 | 12/2015 | Demirors et al. | |
| 2017/0101494 A1 | 4/2017 | Fontaine et al. | |
| 2017/0101495 A1 | 4/2017 | Kapur et al. | |

FOREIGN PATENT DOCUMENTS

| | | |
|---|---|---|
| JP | 2000159829 A | 6/2000 |
| JP | 2001525859 A | 12/2001 |
| JP | 2005523921 A | 8/2005 |
| JP | 2011525212 A | 9/2011 |
| JP | 2013521382 A | 6/2013 |
| JP | 2013534934 A | 9/2013 |
| JP | 2013541631 A | 11/2013 |
| JP | 2013544940 A | 12/2013 |
| WO | 2005108460 A1 | 11/2005 |
| WO | 2007136493 A2 | 11/2007 |
| WO | 2007136494 A2 | 11/2007 |
| WO | 2007136495 A2 | 11/2007 |
| WO | 2007136496 A2 | 11/2007 |
| WO | 2010061630 A1 | 6/2010 |
| WO | 2011025784 A1 | 3/2011 |
| WO | 2011041696 A1 | 4/2011 |
| WO | 2011109563 A2 | 9/2011 |
| WO | 2011146044 A1 | 11/2011 |
| WO | 2011146291 A1 | 11/2011 |
| WO | 2012004676 A2 | 1/2012 |
| WO | 2012004683 A2 | 1/2012 |
| WO | 2012013699 A1 | 2/2012 |
| WO | 2012027448 A1 | 3/2012 |
| WO | 2012064630 A2 | 5/2012 |
| WO | 2012068576 A2 | 5/2012 |
| WO | 2012069428 A1 | 5/2012 |
| WO | 2013101375 A1 | 7/2013 |
| WO | 2014058639 A1 | 4/2014 |
| WO | 2014105411 A1 | 7/2014 |
| WO | 2014105412 A1 | 7/2014 |
| WO | 2014105413 A1 | 7/2014 |
| WO | 2014209927 A1 | 12/2014 |
| WO | 2015045928 A1 | 4/2015 |
| WO | 2015045930 A1 | 4/2015 |
| WO | 2016014749 A1 | 1/2016 |
| WO | 2017058981 A1 | 4/2017 |
| WO | 2018022238 A1 | 2/2018 |

OTHER PUBLICATIONS

Han et al., "Synthesis of diindeno-Fused 4H-Cyclopenta[def]phenanthren-4-ones and Related Compounds via Benzannulated Enediynyl Propargylic Alcohols", J. Org. Chem., 2005, 70: 6, 2406-2408.

Zhang et al., Zirconium Complexes of the Tridentate Bis(aryloxide)-N-heterocyclic-carbene ligand: Chloride and Alkyl Functionalized Derivatives, Journal of Organometallic Chemistry, 2006, 234-242.

Monrabal et al., "Crystallization Elution Fractionation and Thermal Gradient Interaction Chromatography. Techniques Comparison", Macromol. Symp. 2007, 257, 71-79.

Yau, Wallace W. "Examples of Using 3D-GPC-TREF for Polyolefin Characterization", Macromol. Symp., 2007, 257, 29-45.

Bonvonsombat et al., "Regioselective Iodination of Phenol and Analogues Using N-Iodosuccinimide and p-toluenesulfonic Acid", Tetrahedrom Letters, 2009, 50: 22, 2664-2667.

Randoll et al., "Stereoselective and Regioselective Propylene Polymerization with Group 4 Bisphenolate Ether Complexes", Journal of Polymer Science: Part A: Polymer Chemistry, 2012, 2604-2611.

International Search Report and Written Opinion pertaining to PCT/US2018/051638, dated Feb. 5, 2019.

International Search Report and Written Opinion pertaining to PCT/US2018/051680, dated Feb. 5, 2019.

International Search Report and Written Opinion pertaining to PCT/US2018/051939, dated Dec. 10, 2019.

Kiesewetter et al., "Stereospecific Octahedral Group 4 Bis(phenolate) Ether Complexes for Olefin Polymerization", J. Am. Chem. Soc., 2010, 132, 5566-5567.

Office Action dated Jan. 6, 2021 pertaining to U.S. Appl. No. 16/646,228, filed Mar. 11, 2020, 19 pgs.

Office Action dated Jan. 6, 2021 pertaining to U.S. Appl. No. 16/646,237, filed Mar. 11, 2020, 21 pgs.

Notice of Allowance and Fee(s) Due dated Mar. 29, 2021 pertaining to U.S. Appl. No. 16/646,228, filed Mar. 11, 2020, 9 pgs.

Notice of Allowance and Fee(s) Due dated Mar. 31, 2021 pertaining to U.S. Appl. No. 16/646,237, filed Mar. 11, 2020, 10 pgs.

Office Action dated Jun. 25, 2020 pertaining to U.S. Appl. No. 16/646,237, filed Mar. 11, 2020, 30 pgs.

Office Action dated Jun. 25, 2020 pertaining to U.S. Appl. No. 16/646,228, filed Mar. 11, 2020, 29 pgs.

* cited by examiner

BIS-PHENYL-PHENOXY POLYOLEFIN CATALYSTS HAVING AN ALKOXY- OR AMIDO-LIGAND ON THE METAL FOR IMPROVED SOLUBILITY

CROSS-REFERENCE TO RELATED APPLICATIONS

This application is a National Stage Entry under 35 U.S.C. § 371 of International Patent Application No. PCT/US2018/051680, filed Sep. 19, 2018, which claims the benefit of U.S. Provisional Patent Application Ser. No. 62/565,780 filed Sep. 29, 2017, both of which are hereby incorporated by reference in their entirety.

TECHNICAL FIELD

Embodiments of the present disclosure generally relate to olefin polymerization catalyst systems and processes and, more specifically, to bis-phenyl-phenoxy polyolefin procatalyst having one amido-ligand or one alkoxy-ligand on the metal for improved solubility.

BACKGROUND

Olefin-based polymers such as ethylene-based polymers and propylene-based polymers are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing polyethylene may typically comprise a chromium-based catalyst system, a Ziegler-Natta catalyst system, and/or a molecular (either metallocene or non-metallocene (molecular)) catalyst system. The reactants in the diluent and the catalyst system are circulated at an elevated polymerization temperature around the reactor, thereby producing polyethylene homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

Molecular catalyst systems are not easily solubilized in apolar solvents. Since ethylene and other olefins are polymerized in apolar solvents, a large amount of solvent or a caustic solvent, such as toluene or dichlorotoluene, is used in order to dissolve a small amount of catalyst. As a result there is an ongoing need to solubilize a catalyst system with a lesser amount of solvent, while maintaining catalyst efficiency, reactivity, and the ability to produce polymers with a high or low molecular weight.

According to some embodiments, a catalyst system may include a metal-ligand complex according to formula (I):

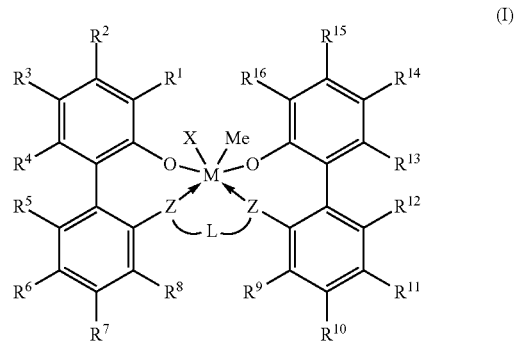

In formula (I), M is a metal chosen from titanium, zirconium, or hafnium, the metal being in a formal oxidation state of +2, +3, or +4. Each X is selected from the group consisting of —OR$^X$ or —NR$^X_2$; in which each R$^X$ is independently a ($C_1$-$C_{50}$)hydrocarbyl, ($C_1$-$C_{50}$)heterohydrocarbyl, or —H, and at least one R$^X$ is ($C_1$-$C_{50}$)hydrocarbyl or ($C_1$-$C_{50}$)heterohydrocarbyl. When X is —NR$^X_2$, optionally two R$^X$ are covalently linked; each Z is independently chosen from —O—, —S—, —N(R$^N$)—, or —P(R$^P$)—; R$^1$ and R$^{16}$ are independently selected from the group consisting of —H, ($C_1$-$C_{40}$)hydrocarbyl, ($C_1$-$C_{40}$)heterohydrocarbyl, —Si(R$^C$)$_3$, —Ge(R$^C$)$_3$, —P(R$^P$)$_2$, —N(R$^N$)$_2$, —OR, —SR$^C$, —NO$_2$, —CN, —CF$_3$, R$^C$S(O)—, R$^C$S(O)$_2$—, —N=C(R$^C$)$_2$, R$^C$C(O)O—, R$^C$OC(O)—, R$^C$C(O)N(R)—, (R$^C$)$_2$NC(O)—, halogen, radicals having formula (II), radicals having formula (III), and radicals having formula (IV):

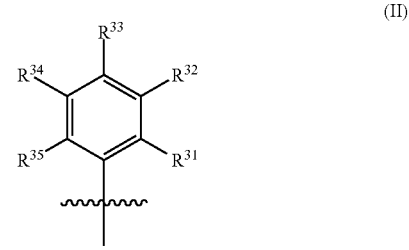

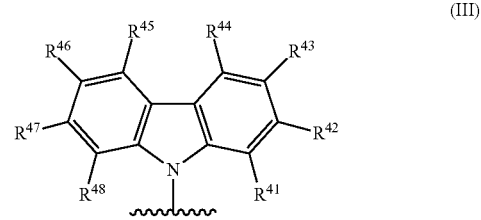

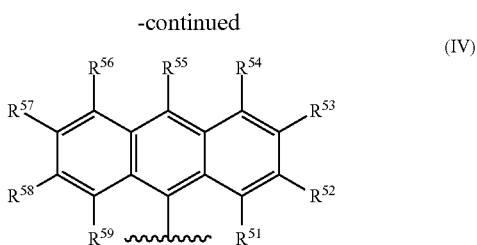

(IV)

In formulas (II), (III), and (IV), each of $R^{31-35}$, $R^{41-48}$, and $R^{51-59}$ is independently chosen from —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N$(R^N)$—, $(R^C)_2$NC(O)—, or halogen, provided at least one of $R^1$ or $R^{16}$ is a radical having formula (II), a radical having formula (III), or a radical having formula (IV).

In formula (I), each of $R^{2-4}$, $R^{5-8}$, $R^{9-12}$, and $R^{3-15}$ is independently selected from —H, $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$—OR$^C$, —SR$^C$, —NO$_2$, —CN, —CF$_3$, $R^C$S(O)—, $R^C$S(O)$_2$—, $(R^C)_2$C=N—, $R^C$C(O)O—, $R^C$OC(O)—, $R^C$C(O)N(R)—, $(R^C)_2$NC(O)—, and halogen. L is $(C_2-C_{40})$hydrocarbylene or $(C_2-C_{40})$heterohydrocarbylene; and each $R^C$, $R^P$, and $R^N$ in formula (I) is independently a $(C_1-C_{30})$hydrocarbyl, $(C_1-C_{30})$heterohydrocarbyl, or —H. The metal-ligand complex according to formula (I) has a solubility greater than the solubility of a comparative complex having a structure according to formula (Ia):

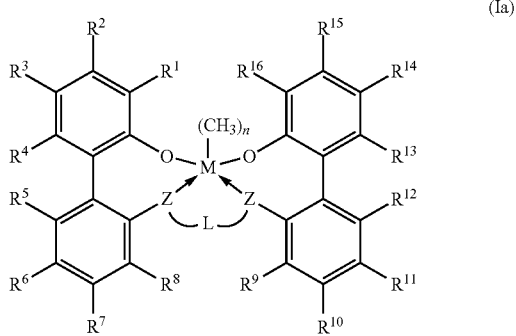

(Ia)

In formula (Ia), M, n, each Z, each $R^{1-6}$ each $R^{31-35}$, each $R^{41-48}$, each $R^{51-59}$, L, each $R^C$, each $R^P$, and each $R^N$ all are identical to corresponding groups of the metal-ligand complex according to formula (I).

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

It, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; Et$_2$O: diethyl ether; CH$_2$C$_2$: dichloromethane; CV: column volume (used in column chromatography); EtOAc: ethyl acetate; C$_6$D$_6$: deuterated benzene or benzene-d6; CDCl$_3$: deuterated chloroform; Na$_2$SO$_4$: sodium sulfate; MgSO$_4$: magnesium sulfate; HCl: hydrogen chloride; n-BuLi: butyllithium; t-BuLi: tert-butyllithium; Cu$_2$O: Copper (I) Oxide; N,N'-DMEDA: N,N'-dimethylethylenediamine; K$_3$PO$_4$: Potassium phosphate tribasic; Pd(AmPhos)Cl$_2$: Bis(di-tert-butyl(4-dimethylaminophenyl)phosphine)dichloropalladium(II); Pd(dppf)Cl$_2$: [1,1'-Bis(diphenylphosphino)ferrocene]palladium(II) dichloride; K$_2$CO$_3$: potassium carbonate; Cs$_2$CO$_3$: cesium carbonate; i-PrOBPin: 2-isopropoxy-4,4,5,5-tetramethyl-1,3,2-dioxaborolane; BrCl$_2$CCCl$_2$Br: 1,2-dibromotetrachloroethane; HfCl$_4$: hafnium(IV) chloride; HfBn$_4$: hafnium(IV) tetrabenzyl; ZrCl$_4$: zirconium(IV) chloride; ZrBn$_4$: zirconium(IV) tetrabenzyl; ZrBn$_2$Cl$_2$(OEt$_2$): zirconium (IV) dibenzyl dichloride mono-diethyletherate; HfBn$_2$Cl$_2$(OEt$_2$): hafnium (IV) dibenzyl dichloride mono-diethyletherate; TiBn$_4$: titanium (IV) tetrabenzyl; N$_2$: nitrogen gas; PhMe: toluene; PPR: parallel polymerization reactor; MAO: methylaluminoxane; MMAO: modified methylaluminoxane; TEA: Triethylamine; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; R$_f$: retention fraction; TLC; thin layered chromatography; rpm: revolution per minute.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—C$_6$H$_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl: tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_4)$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1.3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—. —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "C*" denotes a carbon atom from which a hydrogen atom is removed to form a secondary or tertiary alkyl radical. Examples of substituted $(C_1-C_{10})$alkylene are substituted $(C_1-C_{20})$alkylene. —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2] octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), —N═C(R$^C$)$_2$, —Ge(R$^C$)$_2$—, or —Si(R$^C$)—, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si$(R^C)_2$—, $(C_1-C_{50})$hydrocarbyl-N$(R^N)$—, $(C_1-C_{50})$hydrocarbyl-P$(R^P)$—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings: and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring.

The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl.

The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl.

The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing one to fifty carbon atoms, and one or more heteroatom. The term "$(C_1-C_{50})$heteroalkylene" means a saturated straight or branched chain diradical containing from 1 to 50 carbon atoms and one or more than one heteroatoms. The heteroatoms of the heteroalkyls or the heteroalkylenes may include Si$(R^C)_3$, Ge$(R^C)_3$, Si$(R^C)_2$, Ge$(R^C)_2$, P$(R^P)_2$, P$(R^P)$, N$(R^N)_2$, N$(R^N)$, N, O, OR$^C$, S, SR$^C$, S(O), and S(O)$_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include catalyst systems that include a metal-ligand complex according to formula (I):

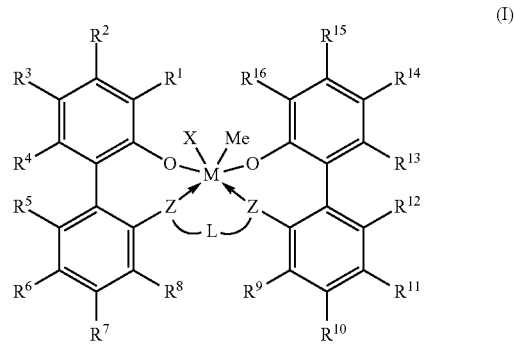

(I)

In formula (I), M is a metal chosen from titanium, zirconium, or hafnium, the metal being in a formal oxidation state of +2, +3, or +4. —OR$^X$ or —NR$^X_2$; wherein each R$^X$ is independently a $(C_1-C_{50})$hydrocarbyl, $(C_1-C_{50})$heterohydrocarbyl, or —H. At least one $R^X$ is $(C_1$-$C_{50})$hydrocarbyl or $(C_1$-$C_{50})$heterohydrocarbyl. When X is —$NR^X_2$, the two $R^X$ are optionally covalently linked. The metal-ligand complex has 6 or fewer metal-ligand bonds and can be overall charge-neutral. Each Z is independently chosen from —O—, —S—, —$N(R^N)$—, or —$P(R^P)$—.

In embodiments, the catalyst system may include a metal-ligand complex according to formula (I), in which each of $R^1$ and $R^{16}$ is independently selected from the group consisting of —H, $(C_1$-$C_{40})$hydrocarbyl, $(C_1$-$C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, —$N=C(R^C)_2$, $R^CC(O)O$—, $R^COC(O)$—, $R^CC(O)N(R)$—, $(R^C)_2NC(O)$—, halogen, radicals having formula (II), radicals having formula (III), and radicals having formula (IV):

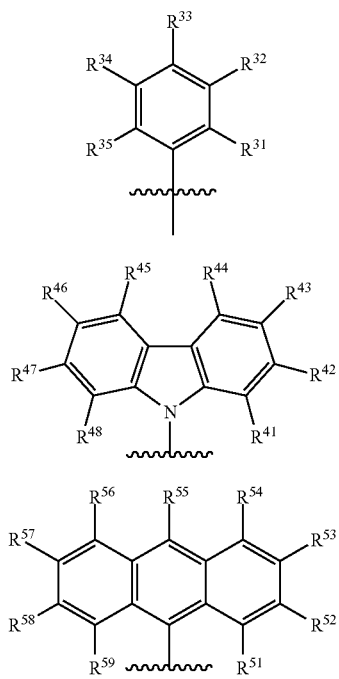

In formula (II), (III), and (IV), each of $R^{31-35}$, $R^{41-48}$, and $R^{51-59}$ is independently chosen from —H, $(C_1$-$C_{40})$hydrocarbyl, $(C_1$-$C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R^N)$—, $(R^C)_2NC(O)$—, or halogen, provided that at least one of $R^1$ or $R^{16}$ is a radical having formula (II), a radical having formula (III), or a radical having formula (IV).

In formula (I), each of $R^{2-4}$, $R^{5-8}$, $R^{9-12}$, and $R^{13-15}$ is independently selected from —H, $(C_1$-$C_{40})$hydrocarbyl, $(C_1$-$C_{40})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, and halogen. In one or more embodiments, L is $(C_2$-$C_{40})$hydrocarbylene or $(C_2$-$C_{40})$heterohydrocarbylene; and each $R^C$, $R^P$, and $R^N$ in formula (I) is independently a $(C_1$-$C_{30})$hydrocarbyl, $(C_1$-$C_{30})$heterohydrocarbyl, or —H.

In embodiments, the metal-ligand complex according to formula (I) has a solubility greater than the solubility of a comparative complex having a structure according to formula (Ia):

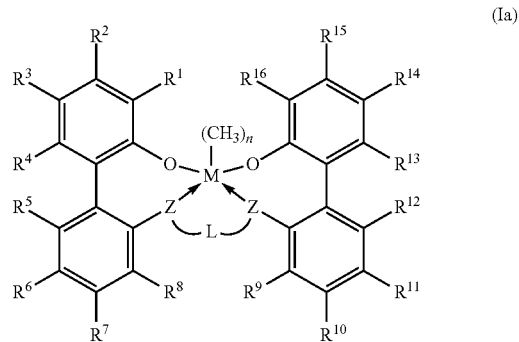

In formula (Ia), M, each Z, each $R^{1-16}$ each $R^{31-35}$, each $R^{41-48}$, each $R^{51-59}$, L, each $R^C$, each $R^P$, and each $R^N$ all are identical to corresponding groups of the metal-ligand complex according to formula (I). Thus, the comparative complex differs from the metal-ligand complex according to formula (I) in that the group X of the metal-ligand complex according to formula (I) are replaced with methyl groups.

The metal-ligand complex of formula (I) and the corresponding comparative complex of formula (Ia) both have a weight percent (wt. %) solubility in various solvents. In general, as used herein, weight percent (wt. %) solubility of a solute in a solution is the weight of the solute divided by the weight of the solution, multiplied by 100.

In this disclosure, one or more individual metal-ligand complex according to formula (I) are oils. Solubility measurements of individual metal-ligand complexes that are oils (herein "oily solute") are conducted by the following Procedure A: (1) nine parts by weight of a solvent such as MCH or Isopar-E™ are added to one part by weight of oily solute (procatalyst); (2) The resulting solution is stored at STP for 48 hours; (3) If the oily solute does not precipitate out of solution, then the weight percent solubility of the oily solute is determined to be at least 10 wt. % (or ≥10 wt. %); (4) If the oily solute precipitates out of solution, then steps (1) and (2) are repeated, where in step (1) nineteen parts by weight of the solvent are added to one part by weight oily solute; (5) If the oily solute does not precipitate out of solution in step (4), then the weight percent solubility of the oily solute is deemed to be at least 5 wt. % and less than 10 wt. %; (6) If the oily solute does precipitate out of solution in step (5), then steps (1) and (2) are repeated, where in step (1) 49 parts by weight solvent are added to one part by weight oily solute; (7) if the oily solute does not precipitate out of solution in step (6), then the weight percent solubility of the oily solute is determined to be at least 2 wt. % and less than 5 wt. %; (8) If the oily solute does precipitate out of solution in step (5), then the weight percent solubility of the oily solute is determined to be less than 2 wt. %.

Solubility measurements of individual metal-ligand complexes that are crystalline are conducted by Procedure B: the solute (procatalyst) is added to a solvent such as methylcyclohexane (MCH) or Isopar-E™, such that the amount of solute added is greater than the amount that will dissolve in that amount of solvent. The resulting suspension is stirred for an hour and then allowed to sit overnight. After sitting overnight (approximately 16 hours), the suspension is filtered through a 0.2-μm PTFE syringe filter into a tared vial. The amount of solution in the tared vial is weighed, and the solvent is removed under reduced pressure. The weight of the residual solid is measured after all solvent is removed.

The wt. % solubility is determined by dividing the weight of the residual solid by the weight of solution in the tared vial and multiplying by 100.

In one or more embodiments, the metal-ligand complex according to formula (I) has a weight percent (wt. %) solubility from 1.5 wt. % to 50 wt. % in methylcyclohexane (MCH) at ambient temperature and pressure. All individual values and subranges encompassed by "from 1.5 wt. % to 50 wt. %" are disclosed herein as separate embodiments. For example, in some embodiments, the solubility of the metal-ligand complex according to formula (I) is from 2.5 wt. % to 15 wt. %, from 1.5 wt. % to 10 wt. %, or from 3.0 wt. % to 15 wt. % in MCH, and in other embodiments, the solubility is greater than 20 wt. % in MCH at standard temperature and pressure (STP) (temperature of 22.5±2.5° C. and a pressure of approximately 1 atmosphere).

In one or more embodiments, the metal-ligand complex according to formula (I) has a wt. % solubility from 1.5 wt. % to 70 wt. % in Isopar-E™ at ambient temperature and pressure. All individual values and subranges encompassed by "from 1.5 wt. % to 70 wt. %" are disclosed herein as separate embodiments. For example, in some embodiments, the metal-ligand complex according to formula (I) has a wt. % solubility from 2.5 wt. % to 15 wt. %, from 2.5 wt. % to 10 wt. %, from 3.0 wt. % to 15 wt. %, or from 10 wt. % to 50 wt. % in Isopar-E™, and in other embodiments, the wt. % solubility is greater than 20 wt. % in Isopar-E™ at STP.

In one or more embodiments, the metal-ligand complex according to formula (I) has a weight percent (wt. %) solubility from 1.5 wt. % to 70 wt. % in methylcyclohexane (MCH) at ambient temperature and pressure. All individual values and subranges encompassed by "from 1.5 wt. % to 50 wt. %" are disclosed herein as separate embodiments. For example, in some embodiments, the solubility of the metal-ligand complex according to formula (I) is from 2.5 wt. % to 15 wt. %, from 1.5 wt. % to 10 wt. %, from 3.0 wt. % to 15 wt. %, or from 10 wt. % to 50 wt. % in MCH. In other embodiments, the solubility is greater than 20 wt. % in MCH at STP.

The metal-ligand complex of formula (I) in MCH at STP has a wt. % solubility of W, as measured by the Procedure A or Procedure B. The corresponding metal-ligand complex of formula (Ia) in MCH at STP has a wt. % solubility in MCH at STP of Y, as measured by Procedure B. A wt. % solubility ratio (SR) is defined as W divided by Y (W/Y). For example, Complex A, a metal-ligand complex of formula (I) that is an oil, has at least a wt. % solubility of 10 in MCH at STP, as measured by Procedure A. Complex B, the corresponding metal-ligand complex of (Ia), has a wt. % solubility of 2.5 in MCH at STP, as measured by Procedure B. Thus, Complex C has a SR of greater than or equal to 4.

In one or more embodiments of this disclosure, the SR of the metal-ligand complex of formula (I) is at least 1.5, at least 2, or at least 3. In some embodiments, the SR is from 1.5 to 50, from 2 to 50, from 2 to 10, from 3 to 15, or from 1.5 to 100. All individual values and subranges encompassed by "from 2 to 100" are disclosed herein as separate embodiments.

Industrial-scale polymerization processes typically involve consumption of many liters of solvent. The more soluble the catalyst is, the less solvent is used during the polymerization process involving the catalyst, which may render a more soluble catalyst more environmentally green than a less soluble catalyst. Additionally, using less solvent in the polymerization process may decrease chain disruptions in the polymer.

In some embodiments, any or all of the chemical groups (e.g., L, $R^{1-16}$, $R^{31-35}$, $R^{41-48}$, $R^{51-59}$) of the metal-ligand complex of formula (I) may be unsubstituted. In other embodiments, none, any, or all of the chemical groups, L, $R^{1-16}$, $R^{31-35}$, $R^{41-48}$, $R^{51-59}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups L, $R^{1-16}$, $R^{31-35}$, $R^{41-48}$, $R^{51-59}$ may be persubstituted with $R^S$. In the chemical groups that are persubstituted with $R^S$, the individual $R^S$ may all be the same or may be independently chosen.

In one or more embodiments, $R^X$ of $-OR^X$ or $-NR^X{}_2$ is $(C_5-C_{50})$alkyl or $-H$ and at least one $R^X$ is $(C_5-C_{50})$alkyl. In other embodiments, X is chosen from an alkyl having the formula $-OC_nH_{2n+1}$ or $NHC_nH_{2n+1}$, in which subscript n is an integer from 10 to 40; from 15 to 30; or from 15 to 25. In some embodiments, X is $-OC_{22}H_{45}$, $-OC_{18}H_{37}$, $-N(C_{18}H_{37})R^X$, $-NH(C_{18}H_{37})$, or $-N(C_{22}H_{45})_2$. Optionally, in some embodiments, the metal-ligand complex according to formula (I), exactly two $R^X$ are covalently linked are covalently linked.

In one or more embodiments, L is chosen from $(C_2-C_{12})$alkylene, $(C_2-C_{12})$heteroalkylene, $(C_6-C_{50})$arylene, $(C_5-C_{50})$heteroarylene, $(-CH_2Si(R^C)_2CH_2-)$, $(-CH_2CH_2Si(R^C)_2CH_2CH_2-)$, $(-CH_2CH_2Ge(R^C)_2CH_2CH_2-)$, or $(-CH_2Ge(R^C)_2CH_2-)$, in which $R^C$ is $(C_1-C_{30})$hydrocarbyl. In some embodiments, L is $-(CH_2)_m-$, in which subscript m is from 2 to 5. In other embodiments, subscript m of $-(CH_2)_m-$, is 3 or 4. In some embodiments, L is 1,3-bis(methylene)cyclohexane or 1,2-bis(2-ylethyl)cyclohexane.

In some embodiments, in the metal-ligand complex of formula (I), either one of $R^1$ or $R^{16}$, or both $R^1$ and $R^{16}$, are chosen from radicals having formula (II), formula (III), or formula (IV):

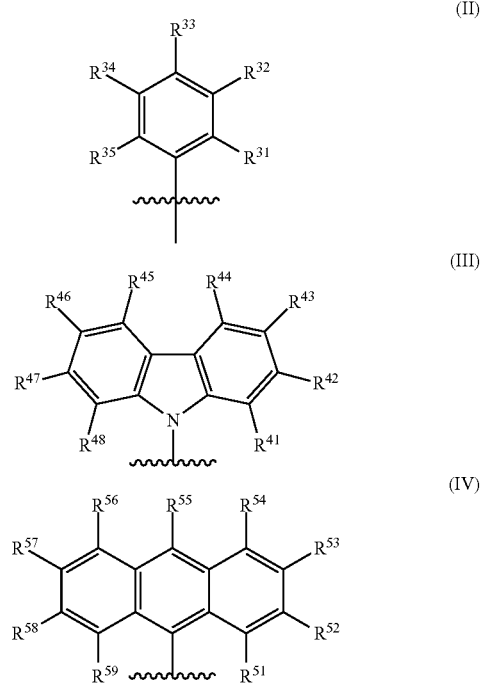

When present in the metal-ligand complex of formula (I) as part of a radical having formula (II), formula (III), or formula (IV), the groups $R^{31-35}$, $R^{41-48}$, and $R^{51-59}$ of the metal-ligand complex of formula (I) are each independently chosen from $(C_1-C_{40})$hydrocarbyl, $(C_1-C_{40})$heterohydrocarbyl, $Si(R^C)_3$, $P(R^P)_2$, $N(R^N)_2$, $OR^C$, $SR^C$, $NO_2$, $CN$, $CF_3$, $R^CS(O)-$, $R^CS(O)_2-$, $(R^C)_2C=N-$, $R^CC(O)O-$, $R^COC(O)-$, $R^CC(O)N(R^N)-$, $(R^N)_2NC(O)-$, halogen, hydrogen (—H), or combinations thereof. Independently each $R^C$, $R^P$, and $R^N$ are unsubstituted $(C_1-C_{18})$hydrocarbyl, $(C_1-C_{30})$heterohydrocarbyl, or —H.

The groups $R^1$ and $R^{16}$ in the metal-ligand complex of formula (I) are chosen independently of one another. For example, $R^1$ may be chosen from a radical having formula (II), (III), or (IV) and $R^{16}$ may be a $(C_1-C_{40})$hydrocarbyl; or $R^1$ may be chosen from a radical having formula (II), (III), or (IV) and $R^{16}$ may be chosen from a radical having formula (II), (III), or (IV) the same as or different from that of $R^1$. Both $R^1$ and $R^{16}$ may be radicals having formula (II), for which the groups $R^{31-35}$ are the same or different in $R^1$ and $R^{16}$. In other examples, both $R^1$ and $R^{16}$ may be radicals having formula (III), for which the groups $R^{41-48}$ are the same or different in $R^1$ and $R^{16}$; or both $R^1$ and $R^{16}$ may be radicals having formula (IV), for which the groups $R^{51-59}$ are the same or different in $R^1$ and $R^{16}$.

In some embodiments, at least one of $R^1$ and $R^{16}$ is a radical having formula (II), where $R^{32}$ and $R^{34}$ are tert-butyl.

In some embodiments, when at least one of $R^1$ or $R^{16}$ is a radical having formula (III), one of or both of $R^{43}$ and $R^{46}$ is tert-butyl and each of $R^{41-42}$, $R^{44-45}$, and $R^{47-48}$ are —H. In other embodiments, one of or both of $R^{42}$ and $R^{47}$ is tert-butyl and $R^{41}$, $R^{43-46}$, and $R^{48}$ are —H. In some embodiments, both $R^{42}$ and $R^{47}$ are —H.

In some embodiments, $R^3$ and $R^{14}$ are tert-octyl, n-octyl, methyl, ethyl, propyl, 2-propyl, butyl, 1,1-dimethylethyl (or tert-butyl). In other embodiments, $R^6$ and $R^{11}$ are halogen. In some embodiments, $R^3$ and $R^{14}$ are methyl; and $R^6$ and $R^{11}$ are halogen.

In some embodiments of the metal-ligand complex of formula (I), when $R^{5-7}$ are fluorine, not more than one of $R^{10-12}$ is fluorine. In other embodiments, when $R^{10-12}$ are fluorine, not more than one of $R^{5-7}$ is fluorine. In other embodiments, fewer than four of $R^{5-7}$ and $R^{10-12}$ are fluorine. In one or more embodiments, $R^7$, $R^8$, $R^9$, and $R^{10}$ are —H. In some embodiments, $R^7$ and $R^{10}$ are halogen. In some embodiments, two of $R^{5-7}$ are fluorine and two of $R^{10-12}$ are fluorine.

The M in the metal-ligand complex of formula (I) may be a transition metal such as titanium (Ti), zirconium (Zr), or hafnium (Hf), and the transition metal may have a formal oxidation state of +2, +3, or +4.

The metal M in the metal-ligand complex of formula (I) may be derived from a metal precursor that is subsequently subjected to a single-step or multi-step synthesis to prepare the metal-ligand complex. Suitable metal precursors may be monomeric (one metal center), dimeric (two metal centers), or may have a plurality of metal centers greater than two, such as 3, 4, 5, or more than 5 metal centers. Specific examples of suitable hafnium and zirconium precursors, for example, include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $TiBn_4$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3^+)$ $(PhCH_2B(C_6F_5)_3^-)$ where M is defined above as being Hf or Zr.

In the metal-ligand complex of formula (I), each Z independently is O, S, $N(C_1-C_{40})$hydrocarbyl, or $P(C_1-C_{40})$hydrocarbyl. In some embodiments, each Z is different. For example, one Z is O and the other Z is $NCH_3$. In some embodiments, one Z is O and one Z is S. In another embodiment, one Z is S and one Z is $N(C_1-C_{40})$hydrocarbyl. (for example, $NCH_3$). In a further embodiment, each Z is the same. In yet another embodiment, each Z is O. In another embodiment, each Z is S.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing $(C_1-C_{20})$hydrocarbyl substituents as described herein. In some embodiments. Group 13 metal compounds are tri$((C_1-C_{20})$hydrocarbyl)-substituted-aluminum or tri$((C_1-C_{20})$hydrocarbyl)-boron compounds. In other embodiments. Group 13 metal compounds are tri(hydrocarbyl)-substituted-aluminum, tri$((C_1-C_{20})$hydrocarbyl)-boron compounds, tri$((C_1-C_{10})$alkyl)aluminum, tri$((C_6-C_{18})$aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris$((C_1-C_{20})$hydrocarbyl borate (e.g. trityl tetrafluoroborate) or a tri$((C_1-C_{20})$hydrocarbyl)ammonium tetra$((C_1-C_{20})$hydrocarbyl)borane (e.g. bis(octadecyl)methylammonium tetrakis(pentafluorophenyl)borane). As used herein, the term "ammonium" means a nitrogen cation that is a $((C_1-C_{20})$hydrocarbyl$)_4N^+$ a $((C_1-C_{20})$hydrocarbyl$)_3N(H)^+$, a $((C_1-C_{20})$hydrocarbyl$)_2N(H)_2^+$, $(C_1-C_{20})$hydrocarbylN(H$)_3^+$, or $N(H)_4^+$, wherein each $(C_1-C_{20})$hydrocarbyl, when two or more are present, may be the same or different.

Combinations of neutral Lewis acid activating co-catalysts include mixtures comprising a combination of a tri((C$_1$-C$_4$)alkyl)aluminum and a halogenated tri((C$_6$-C$_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri((C$_1$-C$_4$)hydrocarbyl)aluminum, tri((C$_1$-C$_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

In some embodiments, when more than one of the foregoing co-catalysts is used in combination, one of the co-catalysts may function as a scavenger. The purpose of the scavenger is to react with any water or other impurities present in the system that would otherwise react with the catalyst leading to reduced efficiency.

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mol %" are disclosed herein as separate embodiments; for example, the ethylene-based polymers, homopolymers and/ or interpolymers (including copolymers) of ethylene and optionally one or more co-monomers such as α-olefins may comprise at least 60 mol % monomer units derived from ethylene; at least 70 mol % monomer units derived from ethylene; at least 80 weight percent monomer units derived from ethylene; or from 50 to 100 mol % monomer units derived from ethylene; or from 80 to 100 mol % units derived from ethylene.

In some embodiments, the ethylene-based polymers may comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the amount of additional α-olefin is less than 50 mol %; other embodiments include at least 0.5 mol % to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally, one or more co-catalysts. In another embodiment, the ethylene-based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene based polymers may compromise from about 0 to about 10 percent by the combined weight of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm$^3$ to 0.950 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1.5 to 25, where MWD is defined as $M_w/M_n$ with $M_w$ being a weight-average molecular weight and $M_n$ being a number-average molecular weight. All individual values and subranges encompassed by "from 1.5 to 25" are disclosed herein as separate embodiments; for example, the polymers resulting from the catalyst system have a MWD from 1.5 to 6. Another embodiment includes a MWD from 1.5 to 3; and other embodiments include MWD from 2 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

SymRAD HT-GPC Analysis

The molecular weight data is determined by analysis on a hybrid Robot-Assisted Dilution High-Temperature Gel Permeation Chromatographer (Sym-RAD-GPC) built by Symyx/Dow. The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and Isopar-E are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

Procedure for Miniplant Polymerization

Raw materials (ethylene, 1-octene) and the process solvent (a narrow boiling range high-purity isoparaffinic solvent Isopar-E™, commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. MMAO, commercially available from AkzoNobel, was used as an impurity scavenger. The individual catalyst components (procatalyst cocatalyst) were manually batch diluted to specified component concentrations with purified solvent (Isopar E) and pressured to above reaction pressure at 525 psig. The cocatalyst is $[HNMe(C_{18}H_{37})_2][B(C_6F_5)_4]$, commercially available from Boulder Scientific, and was used at a 1.2 molar ratio relative to the procatalyst. All reaction feed flows are measured with mass flow meters and independently controlled with computer automated valve control systems.

The continuous solution polymerizations are carried out in a 5 liters (L) continuously stirred-tank reactor (CSTR). The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 50° C. and typically 25° C. The fresh comonomer feed to the polymerization reactor is fed in with the solvent feed. The fresh solvent feed is controlled typically with each injector receiving half of the total fresh feed mass flow. The co-catalyst is fed based on a calculated specified molar ratio (1.2 molar equivalents) to the procatalyst component. Immediately following each fresh injection location, the feed streams are mixed with the circulating polymerization reactor contents with static mixing elements. The effluent from the polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor it is contacted with water to stop the reaction. In addition, various additives such as anti-oxidants, could be added at this point. The stream then went through another set of static mixing elements to evenly disperse the catalyst kill and additives.

Following additive addition, the effluent (containing solvent, monomer, comonomer, hydrogen, catalyst components, and molten polymer) passed through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The separated and devolatized polymer melt is pumped through a die specially designed for underwater pelletization, cut into uniform solid pellets, dried, and transferred into a box for storage.

EXAMPLES

Examples 1 to 2 are synthetic procedures for intermediates of ligands, for ligands themselves, and for isolated procatalysts including the ligands. One or more features of the present disclosure are illustrated in view of the examples as follows:

Example 1: Synthesis of Procatalyst 1

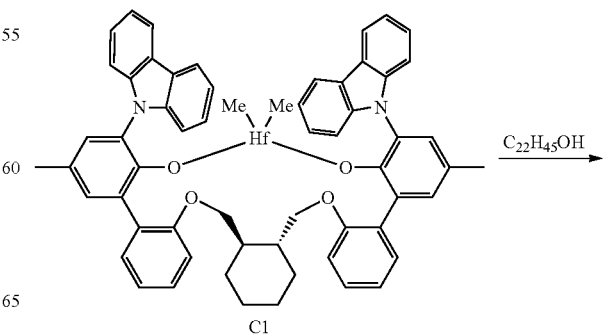

C1

-continued

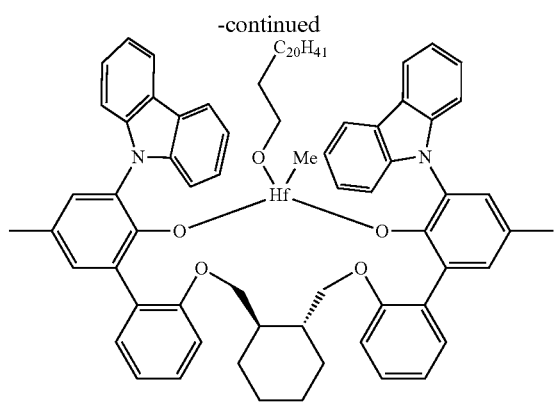

In a glovebox, a 40 mL vial was charged with 20 mL of dry toluene and 264.1 mg of Compound C1. Behenyl alcohol (n-$C_{22}H_{45}OH$) (81.65 mg, 1 equiv.) was added neat at room temperature to the stirred solution of Compound C1 in toluene. The reaction mixture was heated at 60° C. for 4 hours (reaction also can be done at RT—1 day). Toluene was evaporated under educed pressure to give glassy colorless oil of Procatalyst 1 in quantitative yield as a mixture 2.3/0.7 of stereoisomers.

$^1$H NMR (400 MHz, Chloroform-d) δ 8.40-8.05 (m, 4H), 7.63-6.78 (m, 25H), 5.10-2.23 (m, 8H), 2.23-2.03 (m, 6H), 1.50-0.10 (m, 51H), −1.16 (s, 2.3H); −1.18 (s, 0.7H).

Example 2: Synthesis of Procatalyst 3 in toluene. The reaction mixture was heated at 60° C. for 4 hours (reaction also can be done at room temperature for approximately 48 hours). Toluene was evaporated under educed pressure to give glassy colorless oil of Procatalyst 3 in quantitative yield as a mixture 0.7/2.3 of stereoisomers.

$^1$H NMR (400 MHz, Chloroform-d) δ 8.14-7.06 (m, 14H), 6.71 (ddd, J=8.9, 5.6, 3.1 Hz, 2H), 6.21 (ddd, J=8.7, 5.7, 3.1 Hz, 2H), 5.99-5.77 (m, 2H), 3.73-2.23 (m, 7H), 1.51-0.98 (m, 98H), 0.83-0.62 (m, 25H), −0.86 (s, 0.7H); −0.95 (s, 2.3H).

Synthesis of procatalysts 2 and 4 was performed in a similar manner by reaction correspondingly C1 and C2 with octadecylamine for 6 hours at 60° C. in dry toluene.

Example 3: Solubility Study

The final product for Procatalysts 1-4 in pure form was an oil that did not crystallized after one week in freezer. Although, each of the solubility limits of Procatalysts 1-4 in Isopar-E™ were not specifically investigated, Procatalysts 1-4 had a wt. % solubility of at least 10 wt. %. The wt. % solubility of each of the Procatalysts 1-4 was measured according to Procedure A in Isopar E, previously described. No precipitation was observed during a two week period at room temperature.

Procatalysts 1-4 and Comparative Procatalysts C1 and C2 were individually reacted using the polymerization conditions in a single reactor system, as previously described. Properties for the resulting polymers are reported in Tables 2 and 3. Comparative C1 and Comparative C2 have a structure according to formula (Ia). When compared to

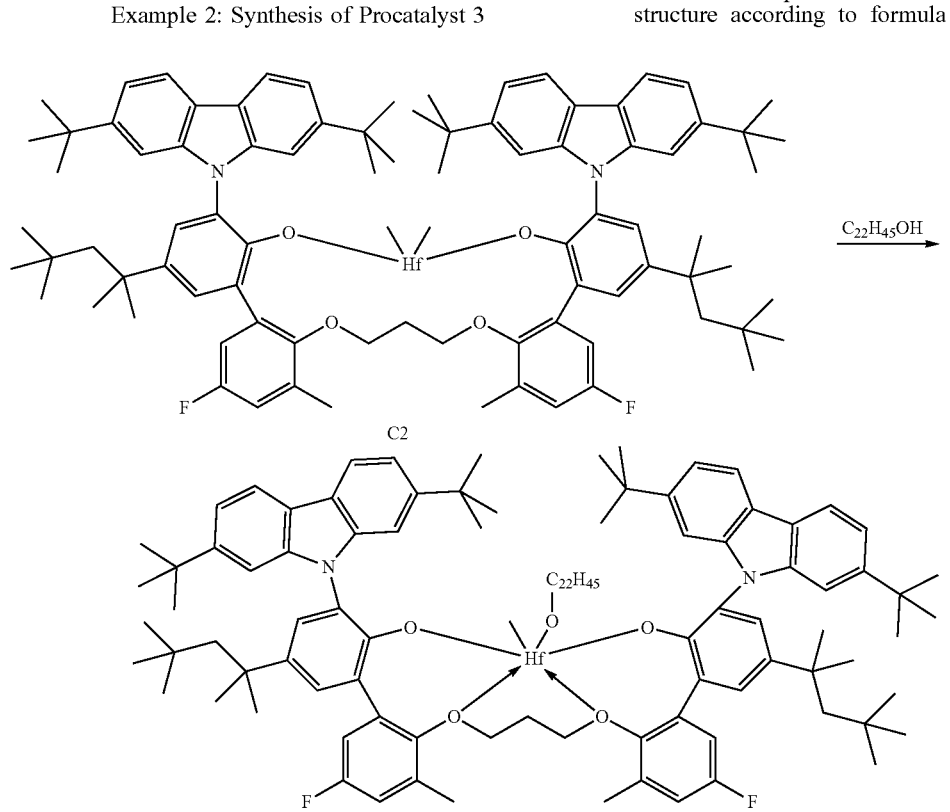

In a glovebox, a 40 mL vial was charged with 20 mL of dry toluene and 173.4 mg of Compound C2. Behenyl alcohol (n-$C_{22}H_{45}OH$) (38.72 mg, 1 equiv.) was added neat at room temperature to the stirred solution of Compound C2

Comparative Procatalysts C1 and C2, a significant increase in weight percent solubility was observed for the Procatalysts 1-4, which are metal-ligand complexes according to formula (I).

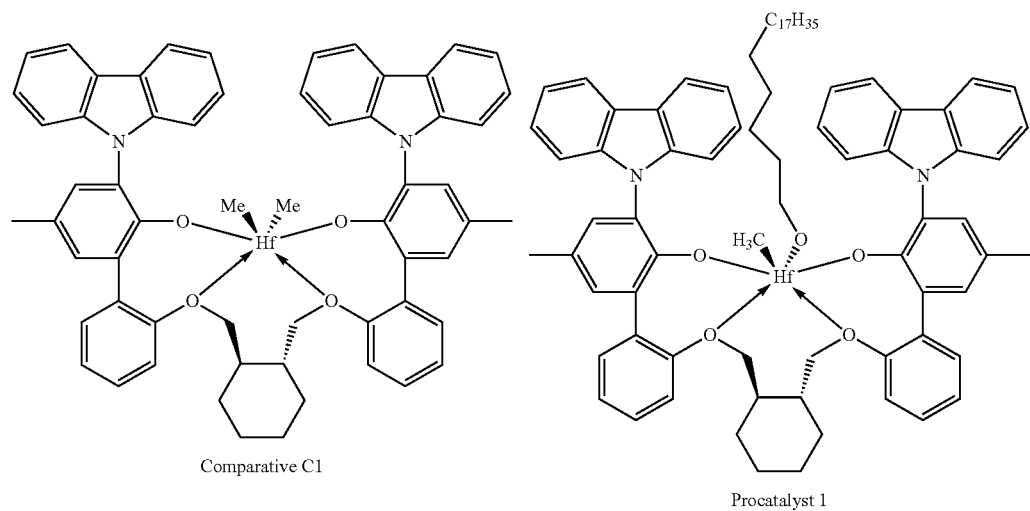
Comparative C1
Procatalyst 1
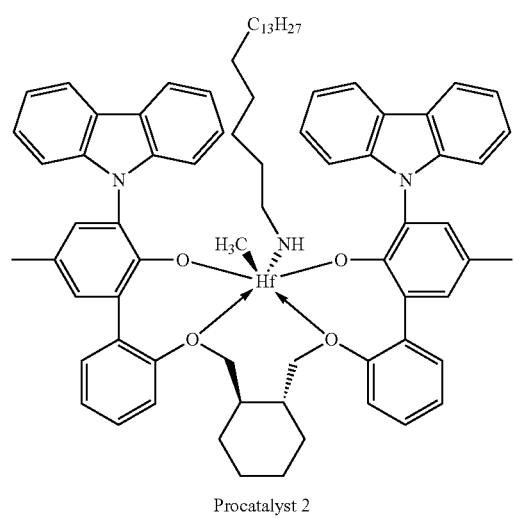
Procatalyst 2
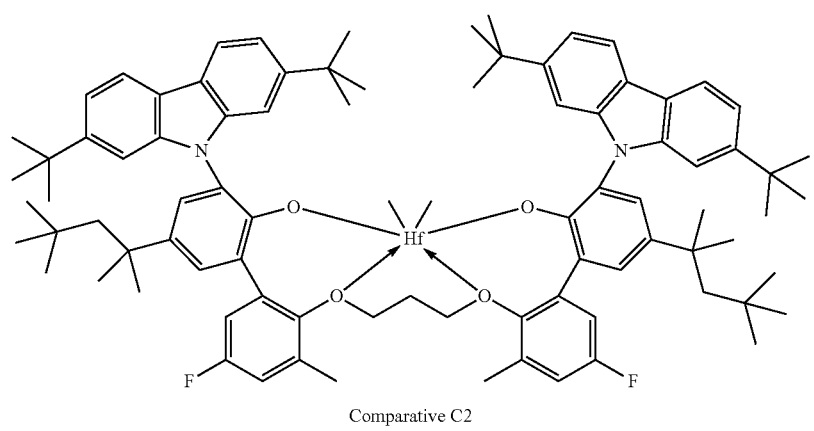
Comparative C2

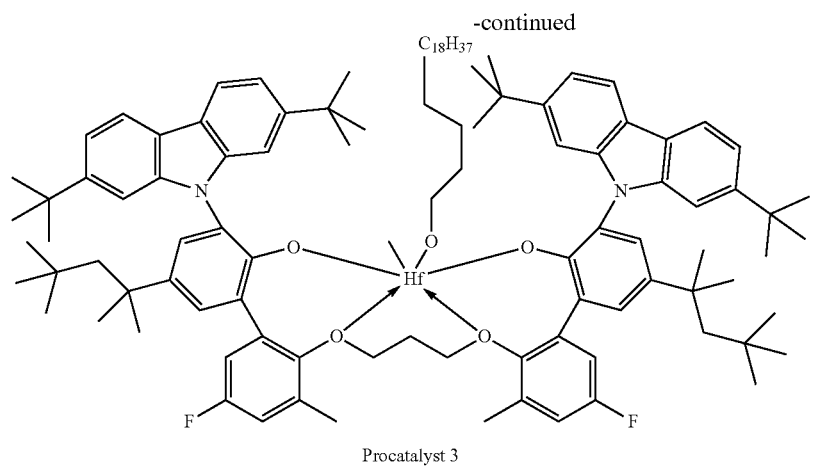

Procatalyst 3

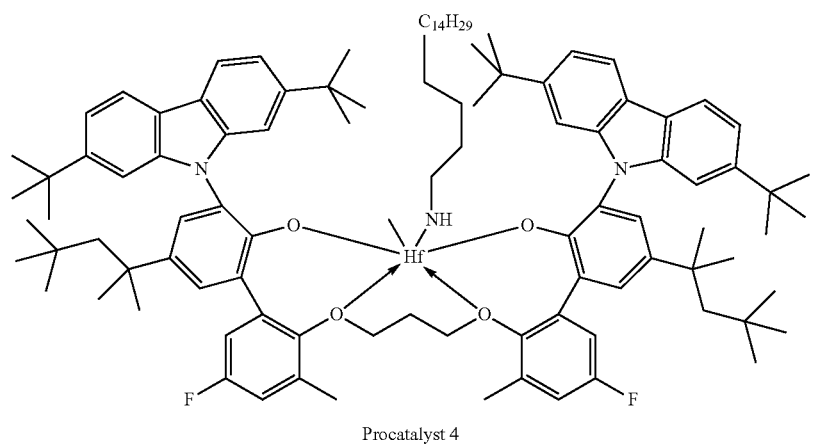

Procatalyst 4

TABLE 1

Solubility Data at 25° C.

| Procatalyst | Solubility (wt. %) | Solvent |
|---|---|---|
| Comparative C1 | 1.4 | Methylcyclohexane |
| Procatalyst 1 | >10 | Isopar-E ™ |
| Procatalyst 2 | >10 | Isopar-E ™ |
| Comparative C2 | <1 | Isopar-E ™ |
| Procatalyst 3 | >10 | Isopar-E ™ |
| Procatalyst 4 | >10 | Isopar-E ™ |

TABLE 2

Batch Reactor Screening of Procatalysts 1 and Comparative 1

| Catalyst | T (° C.) | $H_2$ (mmol) | *Efficiency (MM g/g) | $M_w$ (kg/mol) | $M_w/M_n$ | $T_m$ (° C.) | Density (g/cm$^3$) |
|---|---|---|---|---|---|---|---|
| Comparative C1 | 160 | 40 | 0.32 | 435 | 2.08 | 92 | 0.8936 |
| Procatalyst 1 | 160 | 40 | 0.08 | 437 | 2.07 | 91 | — |
| Procatalyst 2 | 160 | 40 | 0.12 | 439 | 2.02 | 81 | — |

*Efficiency is defined in units of $10^6$ grams polymer per gram of active metal (Hf or Zr).

TABLE 3

Batch Reactor Screening of Procatalysts 3-4 and Comparative C2

| Catalyst | *Efficiency (MM g/g) | $M_w$ (kg/mol) | $M_w/M_n$ | $T_m$ (° C.) | Density (g/cm$^3$) |
|---|---|---|---|---|---|
| Comparative C2 | 0.51 | 276 | 1.95 | 127 | 0.9239 |
| Procatalyst 3 | 0.11 | 293 | 1.98 | 127 | 0.9263 |
| Procatalyst 3-TEA$^\alpha$ | 0.05 | 277 | 1.97 | 127 | 0.262 |

TABLE 3-continued

Batch Reactor Screening of Procatalysts 3-4 and Comparative C2

| Catalyst | *Efficiency (MM g/g) | $M_w$ (kg/mol) | $M_w/M_n$ | $T_m$ (° C.) | Density (g/cm³) |
|---|---|---|---|---|---|
| Procatalyst 4 | 0.08 | 282 | 1.93 | 127, 129 | 0.9254 |
| Procatalyst 4-TEA$^\alpha$ | 0.16 | 255 | 2.01 | 127 | 0.9302 |

Batch reactor conditions for Tables 2 and 3: reaction temperature was 160° C.; 1.47 kg of Isopar™ E; 100 grams of octene, 410 psi of ethylene; RIBS: catalyst ratio was approximately 1.2; Procatalyst: activator ratio was 1:1.2; activator was [HNMe(C$_{18}$H$_{37}$)$_2$][B(C$_6$F$_5$)$_4$]; MMAO-3A was used as an impurity scavenger at a MMAO-3A: procatalyst mole ratio of approximately 50; $^\alpha$ TEA replaced MMAO-3A as the scavenger.

The invention claimed is:

1. A catalyst system comprising a metal-ligand complex according to formula (I):

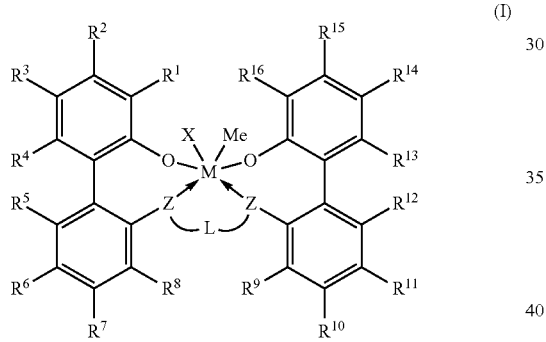

where:

M is a metal chosen from titanium, zirconium, or hafnium, the metal being in a formal oxidation state of +2, +3, or +4;

X is selected from the group consisting of —OR$^X$ or —NR$^X{}_2$; wherein each R$^X$ is independently a (C$_1$-C$_{50}$)hydrocarbyl, (C$_1$-C$_{50}$)heterohydrocarbyl, or —H and at least one R$^X$ is (C$_1$-C$_{50}$)hydrocarbyl, (C$_1$-C$_{50}$)heterohydrocarbyl, and, when X is —NR$^X{}_2$, optionally two R$^X$ are covalently linked;

the metal-ligand complex is overall charge-neutral;

each Z is independently chosen from —O—, —S—, —N(R$^N$)—, or —P(R$^P$)—;

R$^1$ and R$^{16}$ are independently selected from the group consisting of —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)$_2$—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen, radicals having formula (II), radicals having formula (III), and radicals having formula (IV):

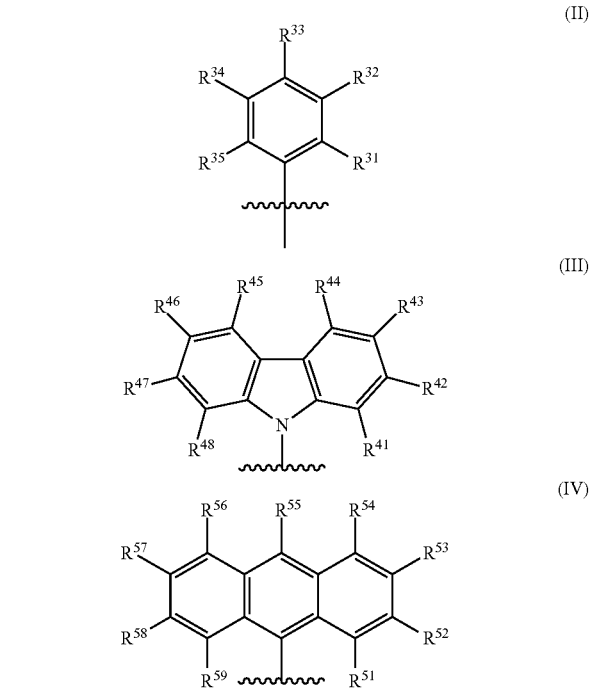

where each of R$^{31-35}$, R$^{41-48}$, and R$^{51-59}$ is independently chosen from —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —N=CHR$^C$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, (R$^C$)$_2$NC(O)—, or halogen, provided that at least one of R$^1$ or R$^{16}$ is a radical having formula (II), a radical having formula (III), or a radical having formula (IV);

each of R$^{2-4}$, R$^{5-8}$, R$^{9-12}$, and R$^{13-15}$ is independently selected from —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, and halogen;

L is (C$_2$-C$_{40}$)hydrocarbylene or (C$_2$-C$_{40}$)heterohydrocarbylene; and each R$^C$, R$^P$, and R$^N$ in formula (I) is independently a (C$_1$-C$_{30}$)hydrocarbyl, (C$_1$-C$_{30}$)heterohydrocarbyl, or —H.

2. The catalyst system according to claim 1, wherein R$^X$ is chosen from (C$_5$-C$_{50}$)alkyl or —H.

3. The catalyst system according to claim 1, wherein R$^X$ is linear.

4. The catalyst system according to claim 1, wherein R$^X$ is branched.

5. The catalyst system according to claim 1, wherein X is chosen from —OC$_x$H$_{2x+1}$ and —NHC$_x$H$_{2x+1}$, where C$_x$H$_{2x+1}$ is a linear alkyl and x is an integer from 10 to 40.

6. The catalyst system according to claim 1, wherein:

M is zirconium or hafnium;

each X is —OC$_{22}$H$_{45}$; and each Z is oxygen.

7. The catalyst system according to claim 1, wherein
M is zirconium or hafnium;
each X is —$OC_{18}H_{37}$; and
each Z is oxygen.

8. The catalyst system according to claim 1, wherein
M is zirconium or hafnium;
each X is —$N(C_{18}H_{37})R^X$; and
each Z is oxygen.

9. The catalyst system according to claim 1, wherein
M is zirconium or hafnium;
at least one X is —$N(C_{22}H_{45})_2$; and
each Z is oxygen.

10. The catalyst system according to claim 1, wherein the metal-ligand complex according to formula (I) has a wt % solubility ratio W/Y of at least 1.5, wherein W is the wt % solubility of the metal-ligand complex of formula (I) in methylcyclohexane (MCH) at standard temperature and pressure (STP); wherein Y is the wt % solubility of a corresponding comparative metal-ligand complex of formula (Ia) in MCH at STP; and wherein the corresponding comparative complex has a structure according to formula (Ia):

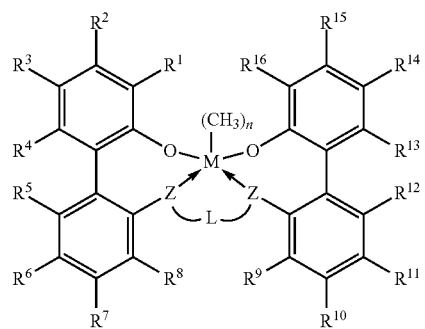

(Ia)

in which M, each Z, each $R^{1-16}$, and L, all are identical to corresponding groups of the metal-ligand complex according to formula (I).

\* \* \* \* \*